United States Patent [19]
Lange

[11] 3,953,190
[45] Apr. 27, 1976

[54] PELLET PREHEATING AND VOLATILE RECYCLING STRUCTURE FOR GLASS MAKING FURNACE

[75] Inventor: Karl H. Lange, Allison Park, Pa.
[73] Assignee: Pullman Incorporated, Chicago, Ill.
[22] Filed: July 28, 1975
[21] Appl. No.: 599,440

Related U.S. Application Data
[63] Continuation of Ser. No. 386,112, Aug. 6, 1973, abandoned.

[52] U.S. Cl. .................................. 65/335; 65/27; 55/77; 55/99; 55/390; 55/479; 432/180; 432/215
[51] Int. Cl.² ......................................... C03B 5/16
[58] Field of Search ............ 65/27, 335; 55/77, 99, 55/390, 474, 479; 432/72, 179, 180, 215

[56] References Cited
UNITED STATES PATENTS

| | | | |
|---|---|---|---|
| 2,179,848 | 11/1939 | Forter | 65/335 X |
| 3,728,094 | 4/1973 | Bowman | 65/335 X |

FOREIGN PATENTS OR APPLICATIONS

| | | | |
|---|---|---|---|
| 914,125 | 6/1954 | Germany | 55/390 |

*Primary Examiner*—Arthur D. Kellogg
*Attorney, Agent, or Firm*—Richard J. Myers

[57] ABSTRACT

A glass making furnace having a preheater and recycling structure including a tubular housing having a lower gas receiving stack section, a top in the form of an inverted cone, a glass batch pellet containing intermediate section, having a lower portion over the cone and about the intermediate section, gas ports in the side of the cone, shield means over the ports, a discharge valve in the lower portion below the cone part, a hot gas stack extending over the upper portion of the pellet section, a fan or hot gas ejector at the top of the stack, a damper above the fan or hot gas ejector connecting with a pressure controller within the furnace for maintaining the pressure in the furnace slightly above atmospheric, an inlet valve outwardly of the upper portion of the pellet section to control the entrance of the pellets, a regenerator on each side of the melting section and port and burner means communicating with each regenerator, a reversing valve connected with the regenerators and the melting section, and a portion of the reversing valve connected with the cooler outside air and the regenerator being fired.

4 Claims, 5 Drawing Figures

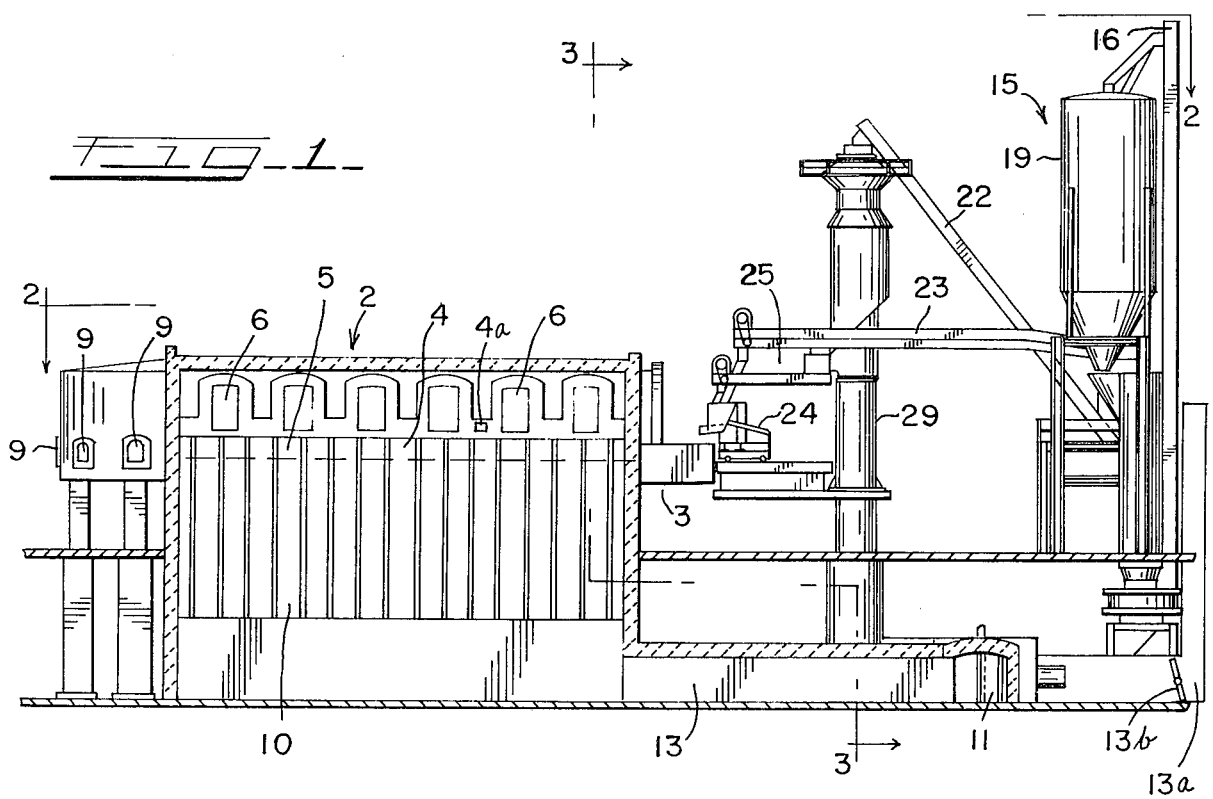
FIG_1
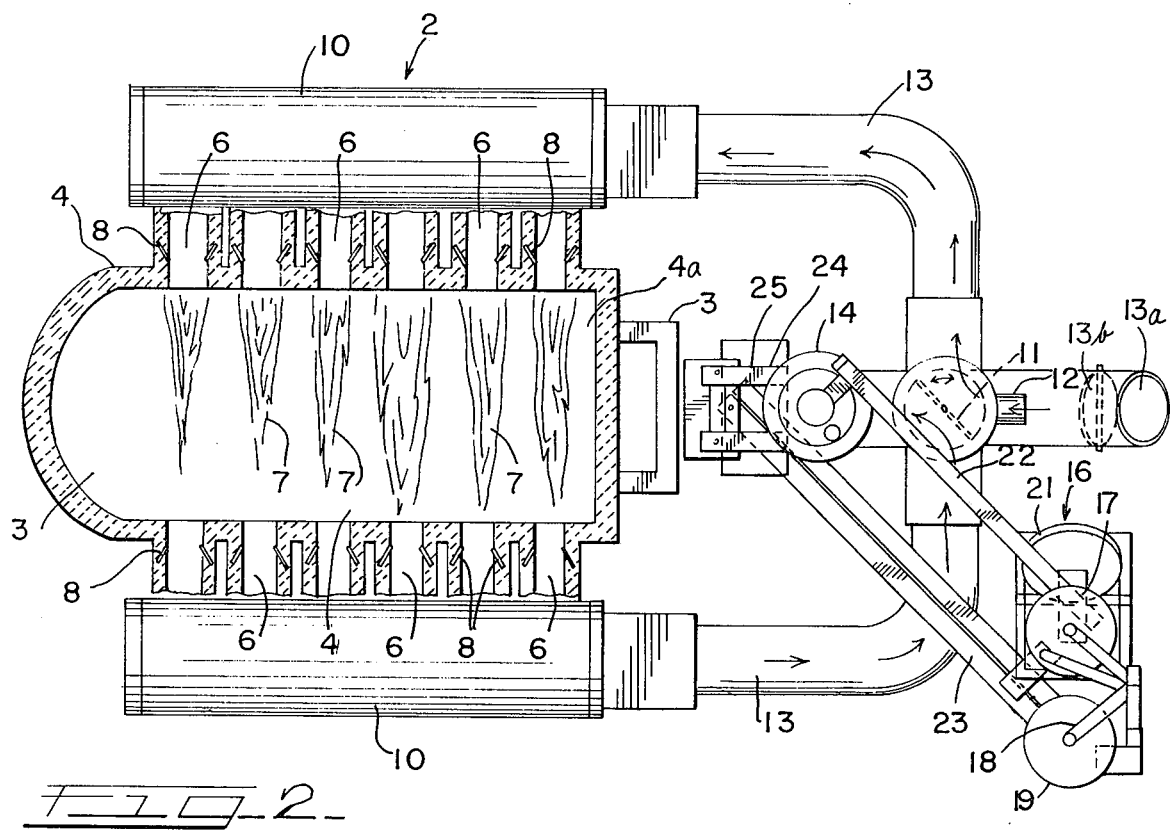
FIG_2

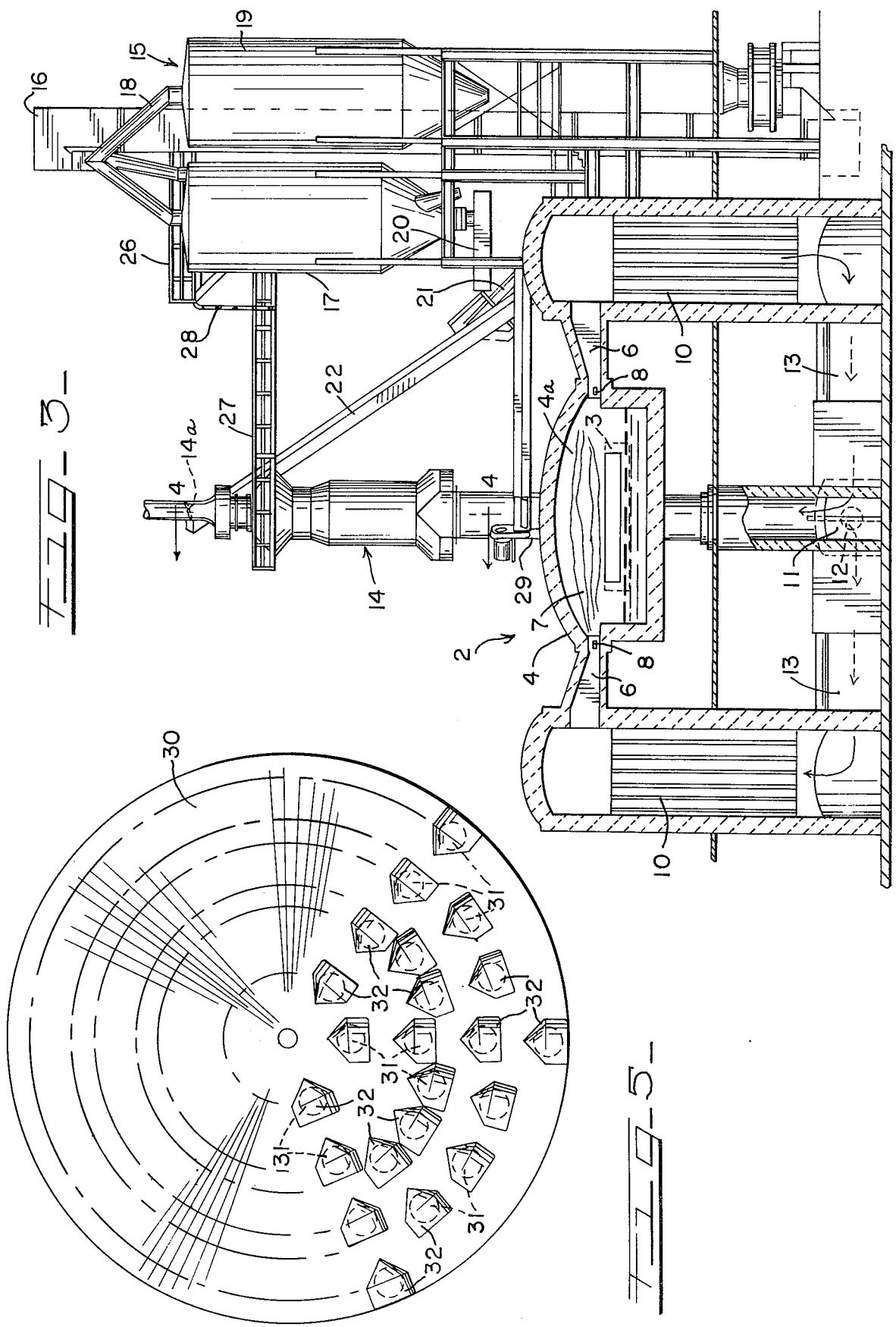

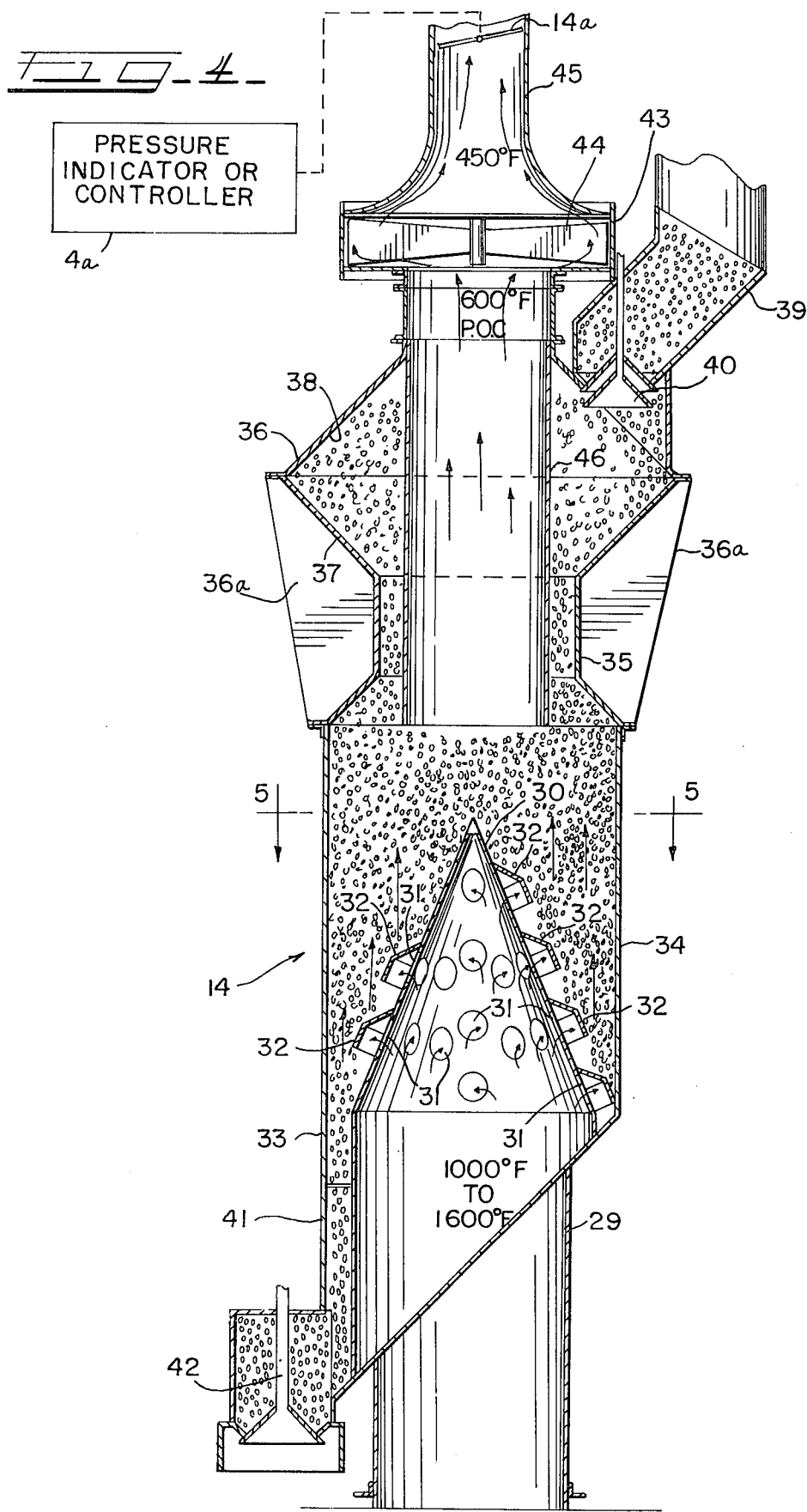

PELLET PREHEATING AND VOLATILE RECYCLING STRUCTURE FOR GLASS MAKING FURNACE

This is a continuation of Ser. No. 386,112, filed Aug. 6, 1973, now abandoned.

BACKGROUND OF THE INVENTION

1. Field of the Invention:

This invention relates to the field of refining of molten raw material and in particular to the field of glass manufacturing, and more particularly relates to structure for the introduction of the glass producing ingredients into the glass making furnace.

2. Description of the Prior Art:

It is known in the prior art to provide for the preheating of pulverous materials used in the manufacturing of glass where such pulverous material is preheated by the fumes above the molten batch in the furnace, as for instance, see U.S. Pat. No. 3,172,648. However, it is desirable to provide for a preheater arrangement which allows for the hot gases above the molten bath of glass to be circulated through the glass making material so that the products of combustion and other volatiles are allowed to condensate out on the glass making material as the heat is given up by the hot gases from the glass manufacturing furnace. The benefits are three-fold in that the condensates are reused and that the condensates are not sent out into the atmosphere eliminating or greatly reducing air pollution and lastly that the charge is preheated. This is what the invention endeavors to accomplish.

SUMMARY OF THE INVENTION

This invention relates to the preheating of pelletized material used in the manufacture of glass wherein the heating of the pelletized material is caused by the vaporized products, dissociated products, carryover products or other products of combustion above the molten bath of glass which hot gases pass through the pellets of silica and other material used in the manufacture of glass.

It is a general object of this invention to provide for a preheating stack in communication with outlet means of the glass making furnace and which stack carries heat transfer modules such as pellets of silica or sand or the like material which pellets have their surfaces exposed to the volatile gases from the melting furnace and which volatile gases condensate out on the surfaces of the pellets so that the pellets are not only heated by the warm gases but are also coated with condensates which may be used in the manufacture of glass and which are not introduced into the outside atmosphere and thus air pollution is reduced.

Another object of this invention is to provide for a preheater of tubular stack design having a low tubular section and having an upper cone portion perforated for introducing hot gases into pellets of glass manufacturing material suspended above the cone in an intermediate tubular stack section about the cone wherein the intermediate pellet containing section has an outlet valve below the cone and an upper inlet valve outwardly of an exhaust stack allowing separation of the gases from the pellets for discharge of the relatively cleansed gases into the atmosphere.

It is another object of this invention to provide for a damper at the top outlet or exhaust above the preheater fan blower or hot gas ejector wherein the damper is movable in response to a pressure control unit within the furnace above the molten bath in order to maintain the pressure in the furnace slightly above atmospheric pressure.

These and other advantages will become apparent from reference to the following description, appended claims and attached drawings.

BRIEF DESCRIPTION OF THE DRAWINGS

FIG. 1 is a side elevational view of the glass making furnace, the sand pellet preheater unit, and the hopper and conveyor structure for dispensing of the batch material of silicious glass batch or the like and the cullet of broken pieces of glass and the pellets of silica and other material;

FIG. 2 is a plan view partially in section and similar to FIG. 1;

FIG. 3 is an end view of the glass manufacturing furnace, the pellet preheater, and the hopper and conveyor apparatus for transferring of the material for manufacturing glass;

FIG. 4 is a sectional view taken along line 4—4 of FIG. 3 and showing the pellet preheater; and FIG. 5 is a sectional view of the preheater showing the interface cone between the pellets and the furnace hot gases and taken along line 5—5 of FIG. 4.

DESCRIPTION OF THE PREFERRED EMBODIMENT

With reference now to the drawings and in particular with reference to FIGS. 1–3, there is shown a glass manufacturing furnace 2 having a dog house 3 for receiving the silica glass batch or other material, a furnace melting portion 4 including a furnace interior 4a containing the glass batch of molten material 5. The furnace melting portion 4 is provided with ports 6 and with burners 8 which spew out gas flames 7 into the furnace interior 4a. The ports 6 communicate with the furnace regenerators or checkers 10, there being one such regenerator or checker 10 on each side of the furnace melting portion. As viewed in FIG. 1, the furnace is provided with glass discharge ports 9 which allow the molten glass to flow from the furnace. As seen in FIG. 2 the flames 7 jet out from the burners 8. About every 15 to 20 minutes this cycle is reversed with the lower burners 8 spewing out the flame 7 toward the upper burners. The regenerators 10 are enlarged areas of refractory material having passages therein which allow air to be introduced into or from the interior 4a of the furnace via the ports 6. While cooler outside air is being introduced through the checker 10 on the right as viewed in FIG. 3 by way of the reversing valve 11 from the outside via air duct opening 12, the reversing valve 11 also permits spent gases from the interior 4a to pass through the ports 6 on the left side of the furnace and out the regenerator 10 on the left side and through the flue line 13 on the left side and via the reversing valve into the glass batch pellet preheater 14. Spent gases comprise the products of combustion, the products of dissociation of raw material and the carryover (dust of batch components). The flow of the spent gases and the combustion air in each half of the furnace is reversed about every 15 to 20 minutes by operation of the reversing valve 11 so that the spent gases flow out of the opposite regenerator to the preheater and the heated combustion air flows from the other regenerator into the furnace. The heated combustion air (which is up to approximately 2000° F.) flows from the same side from which the flame comes and enters into the melting area.

Pelletized material in the form of silica and other material is supplied to the preheater 14 by the conveyor system 22 which in the instant disclosure includes a top bucket conveyor 16 for delivery of a pre-weighed batch of raw material components for glass making to the left hopper or storage bin 17 as viewed in FIG. 3 along with cullet or presized pieces of broken glass by way of header pipes 18. The right hopper 19 is a segmented hopper and may contain all batch or one segment of divided hopper to be used for cullet storage for delivery to the furnace. The batch in the hopper 17 goes to the gravimetric feeder arrangement 20 to the pelletizer 21 which makes pellets which are transferred by pellet conveyor 22 to the top of the preheater unit 14. A dual purpose conveyor 23 may be used primarily to supply cullet to the modified blanket batch feeder, or any other suitable feeder, or its secondary function may be to feed mixed raw batch directly to the feeder when bringing the pelletizing-preheating facility into production or taking unit out of production for inspection and/or maintenance. As seen in FIG. 1 a belt conveyor 25 supplied the heated pellets from the preheater to the charger 24 for loading the dog house 3. Thus it is seen that the glass making furnace may be supplied with either standard glass batches of sand and respective components, cullet, or pellets of glass batch and cullet.

The pellet preheater unit is placed in the path of the hot gases exiting from the regenerators for warming of the glass batch pellets and depositing in the form of condensates the volatile material and dust picked up by the flame fronts moving above the molten bath. The pellet preheater unit 14 is interconnected with the hoppers 17 and 19 by walks 26 and 27 and ladder 28. The pellet preheater unit 14 comprises a lower stack or pipe section 29 (see FIG. 4) which receives the products of combustion such as the volatiles and fine particles from the furnace interior via the flue 13 that communicates with the hot gas exiting from the proper regenerator due to the positioning of the reversing valve 11. This hot gas contained in stack section 29 is provided with a cone top portion 30 provided with a plurality of apertures 31 that have hood members or shields or protective ramps 32 thereover to prevent pellets from entering the apertures 31 from above and falling into the hot gas stack section 29. Extending above and having its lower portion 33 extending over the cone top portion 30 is a pellet containing tubular or stack section 34 which is also tubular shaped and in addition to the lower portion 33 has an upper reduced portion or annulus part 35 reinforced by struts 36a. Pellet stack section 34 is further provided with a top section 36 that has lower inwardly downwardly sloping wall 37 and upper inwardly upwardly sloping wall 38 that connects with pellet entrance pipe 39 that has a conical valve and seat arrangement 40 to control the flow of pellets into the pellet section 34. The lower portion 33 of the pellet section 34 is provided with a lower end part 41 that extends around the hot gas stack section 29 and connects with the discharge cone valve arrangement 42 which is like the inlet conical valve arrangement 40 and permits discharge of the pellets from the pellet section 34 onto the pellet conveyor 25. The top part 36 of the pellet section 34 is provided with a blower fan housing 43 having a blower fan 44 therein for delivery of the gases upwardly out of flue exiting stack 45 to the atmosphere. By this arrangement the condensates are stripped from the exiting flue gases and stored on the outer surfaces of the pellets which are also heated by the warm gases so that as the flue gases exit into the atmosphere they are cooler. The gases in the hot gas stack 29 range from 1000° F. to 1600° F. and gradually become cooler as they are drawn through the pellet section 34 and in the area of the fan 44 the products of combustion are generally in the area of 600° F. or lower and these products of combustion exit from the outer flue stack 45 at approximately 450° F. or less.

The slope wall 37 allows the pellets to come in contact with the metal surface of the pellet stack section to further heat the pellets, and the cone valves at the entrance and exit portions of the preheater provide for even distribution of the pellets for even discharge feeding. The pellets in the pellet section 34 provide about a 44 percent packing void to provide for adequate surface contact between the condensates and the pellets and further provide for adequate heat transfer from the hot gases to the pellets. The cylindrical exhaust inlet tube 46 connecting with the fan housing 43 and extending into the top of the pellet section 34 has its bottom portion adjacent the cone part 30 and aids in conducting the gases out the upper stack portion 45. This preheater unit provides for savings in heat loss and in loss of condensates of the products of combustion.

Above the furnace melting portion 4 on the interior walls of the furnace 2 there is provided a pressure indicator and controller 14b which senses th pressure above the molten material 5 within the furnace 2 and in turn operates the damper or valve 14a which is located in the preheater unit across the upper stack portion 45 above the blower fan 44 (see FIG. 4). The furnace atmosphere pressure control 14b includes the conventional gaseous pressure indicating device and pressure responsive controller arrangement which operates a drive motor to open and close the damper 14a. This controller 14b controls the pressure within the furnace within limits which are above atmospheric pressure. The approximate range is from 0.005 to 0.15 inch of mercury above atmospheric pressure, wherein every atmosphere of pressure is 14.7 psi or 27.8 inches of mercury. This controller 14b prevents the development of negative pressure or pressure below atmospheric pressure so that fuel will not be wasted by attempting to warm air and act upon the infiltration of cold air. The locating of the damper 14a above the fan 44 takes into consideration the collection of the condensates in the pellets and, therefore, as the pressure in the furnace above the molten bath would decrease this would cause increased opening of the valve or damper 14 a to maintain a draft or positive pressure on the furnace because otherwise we would be introducing the preheater to atmospheric pressure. The range of 0.005 to 0.15 inch of mercury meets the necessary furnace requirements and with the valve above the pellets being open the fan is allowed to become more efficient and less cavitation develops. It is desirable to have a back pressure against the fan to maintain a controlled pressure above the bath pressure but if the valve or damper would be below the pellets there would be fluidizing of the pellets during loading of the pellets in the preheater. This fluidizing will not occur if the valve or damper is above the fan to put static pressure against the fan. An emergency stub stack 13a (see FIG. 1) connects with the exhaust tubing 13 and is provided with a damper 13b to operate as an emergency furnace pressure control. This valve or damper 13b allows excessive pressure to be exhausted from the furnace.

The glass making furnace may not in all cases be limited to the regenerative type furnace only.

Preheating of the pellets includes not only an increase of temperature of the pellets but also any accompanying change in the physical or chemical state of the pellets as a result of preheating such as the formation of a eutectic phase in the pellets.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

I claim:

1. A pellet preheater adapted to receive the exiting combustion gases from a glass furnace for heating pellets to be introduced to the glass furnace comprising a tubular hot gas stack section adapted to being connected to receive the exiting combustion gases from the glass furnace, a top portion of the hot gas stack section being apertured to allow the combustion gases to pass therethrough, a cylindrical exhaust tube to carry gases out of the preheater, and a pellet containing stack section receiving and holding the pellets while they are heated and coated by the condensate from the combustion gases, said pellet stack section surrounding the hot gas stack section and the exhaust tube and including a lower portion, above that a reduced portion and above that a top section, the lower portion of the pellet stack section surrounding the top portion of the hot gas stack section and including a discharge valve to allow discharge of the heated pellets from the preheater, the top section of the pellet stack section surrounding the exhaust tube and including an intake valve to admit pellets to the preheater, the reduced portion of the pellet stack section joining the top section and the lower portion of the pellet stack section and surrounding the exhaust tube, said reduced portion including an inwardly and downwardly sloping surface to heat the pellets by contact with the exhaust tube and the sloping surface of said reduced portion.

2. A pellet preheater as claimed in claim 1 wherein there is a fan connected to the exhaust tube to draw the exiting gas out from the pellet stack section of the preheater.

3. A pellet preheater as claimed in claim 1 wherein the intake valve and the discharge valve have the form of inverted cone-shaped surfaces to control the passage of pellets therethrough.

4. A pellet preheater as claimed in claim 1 wherein a downwardly and outwardly sloping surface connects the reduced portion and the lower portion of the pellet stack section to allow the lower portion to have a greater volume capacity so as to allow for maximum contact between the combustion gas and the pellets.

* * * * *